United States Patent Office 3,511,156
Patented May 12, 1970

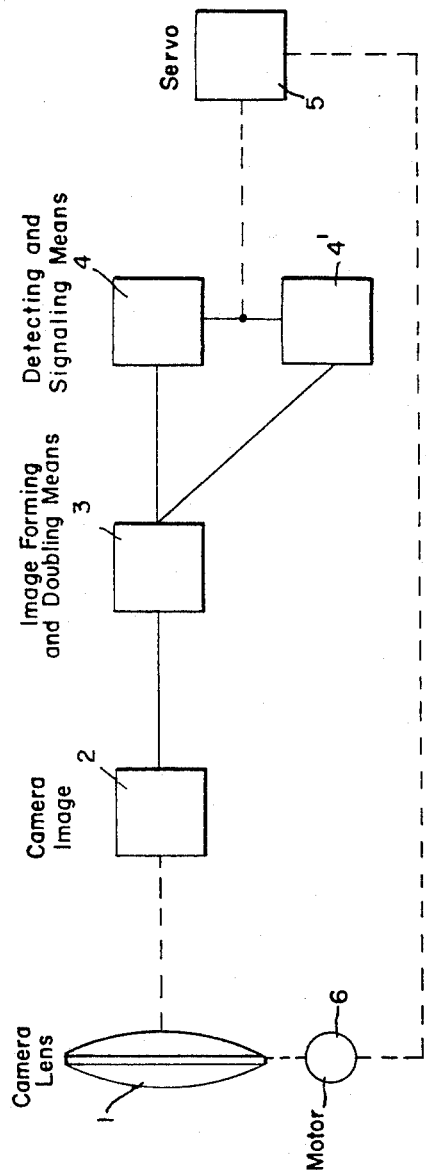
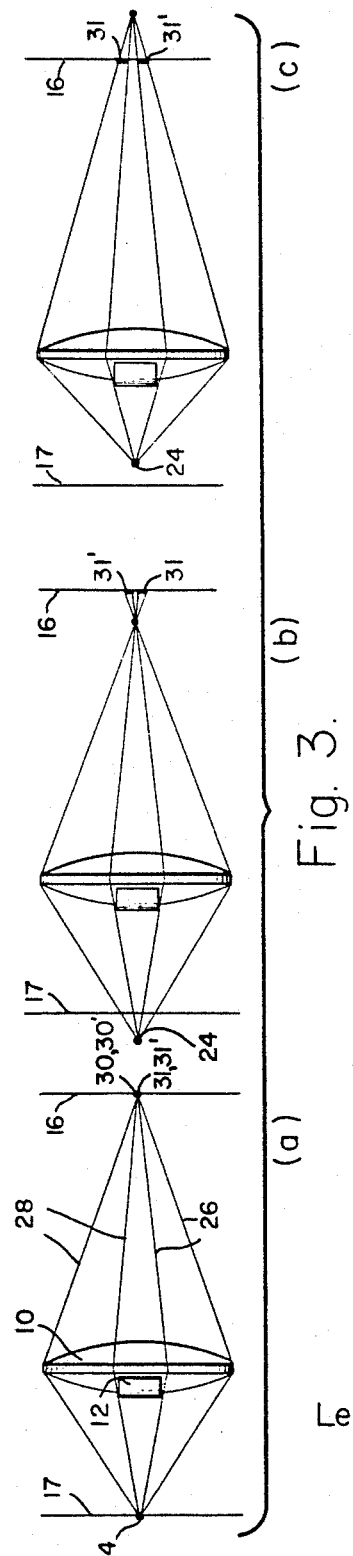
Fig. 1.
Fig. 3.
Leonard Larks,
INVENTOR.
BY.
Golove & Kleinberg
ATTORNEYS.

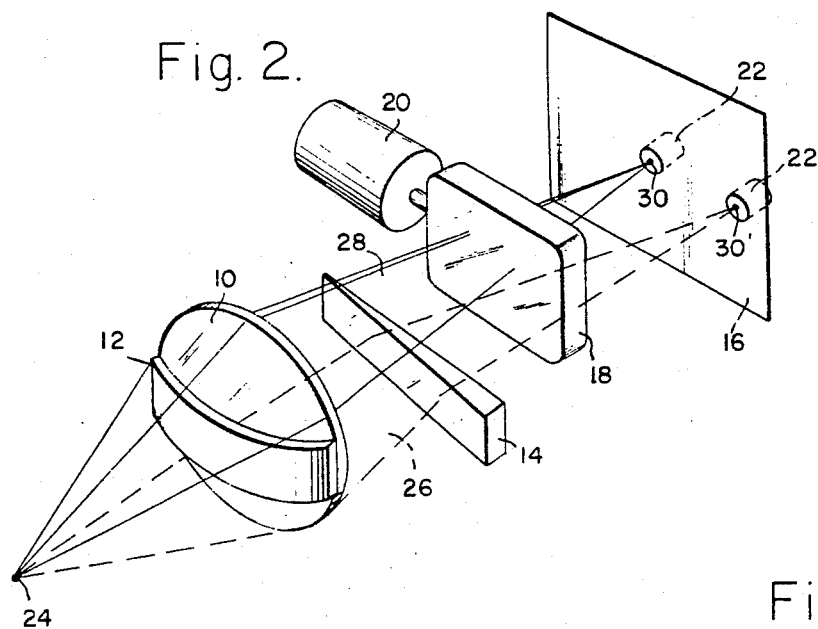
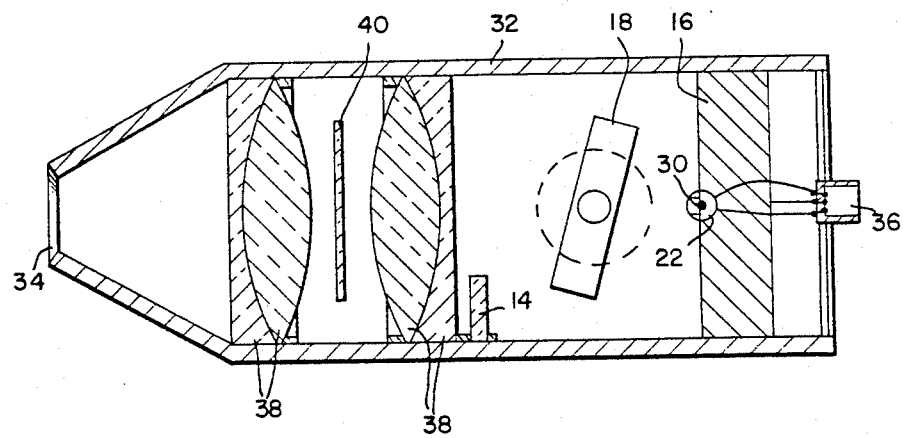
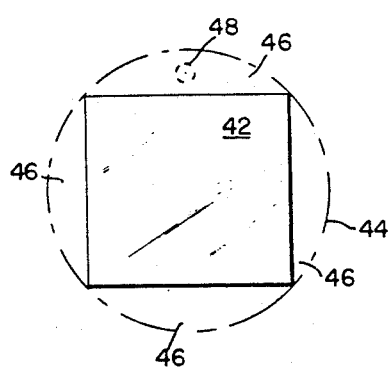

3,511,156
AUTOMATIC FOCUS DETECTOR
Leonard Larks, West Covina, Calif., assignor to Hycon
Mfg. Company, Monrovia, Calif.
Filed Nov. 26, 1965, Ser. No. 509,963
Int. Cl. G03f 3/10
U.S. Cl. 95—45                                   19 Claims

ABSTRACT OF THE DISCLOSURE

Apparatus for detecting changes in focus of a camera image, and for automatically maintaining the camera image in optimum focus. A Scheiner lens system continually examines the camera image and produces an electrical error signal when the camera is out of focus, the signal corresponding to the direction and magnitude of the focusing error, to thereby actuate a servo mechanism for automatically placing the camera back into focus. The lens system includes a Scheiner lens for obtaining two images, a reference plane having photosensitive elements therein, a prism for laterally shifting one of the images with respect to the other, and a rotating optical element for producing a vertical sweep of the images across the reference plane. The images are laterally spaced from each other by a predetermined distance so that each one will impinge upon one of the photosensitive elements in the reference plane. The photosensitive elements measure the vertical alignment of the images on the reference plane and will produce an error signal if these images are not properly aligned with one another.

---

This invention relates to focus detecting systems, and, more particularly, to devices for controlling and testing the focus of an image in a camera.

Although aerial surveillance systems currently in use include cameras with lenses that have on-axis resolutions greater than 500 lines per millimeter, it has generally been experienced that as a practical matter, the resolution of such systems is as poor as 70 lines per millimeter. One of the main causes of resolution degeneration is the defocusing of the lens that occurs during picture taking, whether caused by environmental effects or by uncontrolled altitude changes of the camera. Any device which could automatically maintain the lens in optimum focus would be responsible for a significant improvement in overall system resolution.

According to the present invention, a signal is derived from a continuous monitoring of the camera image. This signal is used to control accurately the distance between the objective lens of the camera and the image plane with respect to the platen, automatically maintaining focus of the image produced in the emulsion plane of the film.

When used with a camera for aerial surveillance, for example, a preferred embodiment of the invention examines the aerial image produced at or near the emulsion plane of the film by the objective lens of the camera; off-axis rays from the camera lens are examined so as not to interfere with the image produced on the film. This examination of the image corrects the errors introduced by atmospheric effects upon the lens, which would be present in a system that determines target distance and sets focus for this distance. Furthermore, this examination is continuous while the camera is in operation, or in an alternative embodiment tests a camera when not equipped with a device according to the preferred embodiment.

A servo-type signal, indicating errors in focus position, may be provided, permitting the position of the camera lens to be accurately controlled so that the image at the emulsion plane of the film is maintained in focus.

The present invention is not limited to use with aerial cameras, but may be used for sensing focus at a predetermined plane of any optical system and for automatically maintaining image focus at that plane. Examples of such use would be the incorporation of the present invention in opthalmic instrumentation as an automatic refractometer, or a photo electric keratometer, and in television and motion picture camera systems.

The present invention is characterized by:

(a) image forming and doubling means, having a reference plane, said means adapted to be positioned to receive the optical system image as an object with respect to said means, for forming at said reference plane double images of the object, the lateral separation of said double images in a first direction being related to the displacement of the optical system image from the optical system predetermined plane, and said double images being laterally separated a predetermined distance in a second direction orthogonal to said first direction; and (b) detecting and signalling means positioned to receive said double images at said reference plane, for detecting their separation with respect to each other in said first direction, and for producing a signal corresponding to information so detected.

Consequently, the signal corresponding to the separation of the double images with respect to each other in the first direction is related to the displacement of the optical system image from the optical system predetermined plane. As used herein, the term "double images" is defined as the two areas of illumination at a "reference plane," produced by the interception of the light rays formed by the "image forming and doubling means" with the reference plane included by said means.

A preferred embodiment of the invention is similar in concept to the apparatus described by the inventor in an article entitled, "A Microminiature, Automatic Recording, Infra-Red Coincidence Optometer Detector Module," appearing in the Journal of Scientific Instruments, vol. 41, p. 780 (December 1964).

The system of the preferred embodiment uses a "Scheiner" lens which is a lens having an occluded central area such that only the top and bottom of the lens is used, to obtain two optically coincident images when the Scheiner object (the aerial image formed by the camera lens or other optical system) and Scheiner images (formed by the Scheiner lens) are at conjugate focus. This condition is realized when the camera image is at optimum focus, in the emulsion plane of the film. As used herein, the term "Scheiner images" is defined as the area of illumination at a reference plane (herein called the "Scheiner image plane"), produced by the interception of the light rays formed by the Scheiner lens with the reference plane. Should the Scheiner object "move" away from the original position—a condition which occurs when the image formed by the camera lens is no longer in the emulsion plane of the film, or "out of focus"— while the location of the Scheiner image plane remains unchanged, the two Scheiner images will separate in a plane perpendicular to the long axis of the occluded area of the Scheiner lens. If the long axis of this occluded area crosses the Scheiner lens horizontally, the Scheiner images will be vertically separated.

The amount of the vertical separation of the Scheiner images is a function of the focal length and the aperture of the Scheiner lens, and of the distance by which the image formed by the camera lens is displaced from the emulsion plane of the film. Since the parameters of the Scheiner system can be selected and held constant, the vertical separation of the Scheiner images relative to each other is a function of the distance and direction by which the image formed by the camera lens is displaced from the emulsion plane of the film, or "out of focus."

Various methods may be employed to sense the vertical separation of the Scheiner images in order to detect focus degradation of the camera image. The method used in this preferred embodiment of the present invention entails the relating of the vertical separation of the Scheiner images to a time separation of two electrical signals, each corresponding to one of the images. A pair of photo detectors is provided in the Scheiner image plane and a system is provided to "pulse" the images upon the photo detectors, thereby converting any vertical separation to a separation in time that can be a function of the "pulse" rate. A resultant electrical error signal is then provided which has a magnitude and polarity based upon this time difference.

This technique preliminarily requires an unchanging horizontal lateral separation to exist between the Scheiner images. This is accomplished by the placement of a thin prism behind one portion of the Scheiner lens and in the path of the light rays which form one of the Scheiner images. This image is thus horizontally deflected a fixed amount, relative to the upper image. When the camera image is located at a predetermined plane, i.e., the emulsion plane of the film, the two laterally separated Scheiner images will be horizontally aligned, defining reference points in the Scheiner image plane which indicate "optimum" focus of the camera image.

Between the prism and the Scheiner image plane, there is positioned in the path of the light rays which produce both Scheiner images, a plane parallel slab, which rotates at a constant speed about an axis which is parallel to the long axis of the occluded area of the Scheiner lens. The light rays impinging upon this rotating slab are refracted such that the Scheiner images vertically "sweep" the Scheiner image plane. Each Scheiner image is then coincident with its corresponding reference point once during each half revolution of the plane parallel slab. Any relative vertical displacement of the images results in a time delay between the sweeping of the reference points. In this manner, the vertical distance between the two Scheiner images on the Scheiner image plane is related to a time coordinate.

A light sensor, for example a photo electric cell, is positioned at each of the reference points in the Scheiner image plane. The impinging of the first Scheiner image upon its corresponding light sensor produces a first electrical signal, and a second electrical signal is produced by the second Scheiner image impinging upon its light sensor. Since the Scheiner images are scanned at some predetermined frequency relative to the rotation of the slab, these two electrical signals bear a "phase" relationship to each other, determined by the sequence in which the scanned Scheiner images sweep across their respective light sensors.

The Scheiner images are referenced to be horizontally aligned with no vertical separation when the camera image is "in focus," and the two images will sweep across their respective light sensors simultaneously. Therefore, the phase difference between the two electrical signals will be zero at this condition. As the camera image moves "out of focus," the corresponding vertical separation of the Scheiner images will result in a time difference between excitation of the respective light sensors. The phase difference, relative to the scanning frequency, between the two electrical signals increases in a fixed relationship to the degradation of the focus of the camera image. The magnitude and sense of this phase difference are measures of the distance and direction, respectively, by which the camera image is out of focus.

The two electrical signals are processed to provide a resultant error signal of the type required to drive a servo system which repositions the camera lens system to achieve proper focus. For example, the electrical signals from the photo sensors may be fed into identical high gain amplifiers, and then into squaring amplifiers to create steep leading edges. The outputs of these squaring amplifiers may then be fed into Schmitt trigger circuits having stable and sensitive threshold characteristics. The shaped and standardized pulses may then be fed into a phase-angle detector, the output of which will be an electrical signal having a polarity in accordance with phase sense and a magnitude proportional to pulse separation. The resultant signal may then be used to drive the servo.

It is noted that the use of phase difference to sense quality of focus rather than light intensity, makes this preferred embodiment of the invention insensitive to changes in light intensity. However, the type of light sensor utilized depends upon the type and intensity of the incident light; for example, photo multiplier tubes may be used for very low levels of incident light.

It is also noted that although reference has been made to a single Scheiner lens, a series of lenses with a common occluded central area can accomplish the same purpose and may be considered as equivalent to the single Scheiner lens.

In an alternative embodiment of the invention, the focus of the camera system may be tested when the camera is not taking pictures. In this alternative embodiment, the camera lens is temporarily converted into a Scheiner lens, and the Scheiner images are produced on a translucent screen positioned in the image plane of the camera. A light source is located in this image plane, which is received by the lens and reflected back by two mirrors appropriately positioned in front of the lens. The vertical positions of the Scheiner images are then visually compared.

The novel features which are believed to be characteristic of the invention, together with further advantages thereof, will be better understood from the following description considered in connection with the accompanying drawings in which preferred embodiments of the invention are illustrated by way of example. It is expressly understood, however, that the drawings are for the purpose of illustration and description only, and are not intended as a definition of the limits of the invention.

FIG. 1 is a block diagram of a system according to the present invention, in combination with a camera;

FIG. 2 is a diagrammatic representation of the optical portion of a preferred embodiment of the present invention;

FIG. 3 is a series of diagrams showing alternative optical configurations presented by the embodiment shown in FIG. 2;

FIG. 4 is a cross-sectional view of a mechanization of a preferred embodiment of the invention, packaged within a convenient housing;

FIG. 5 is a view of the image plane of a camera system indicating the placement of a focus detecting unit according to the present invention.

Figure 6:
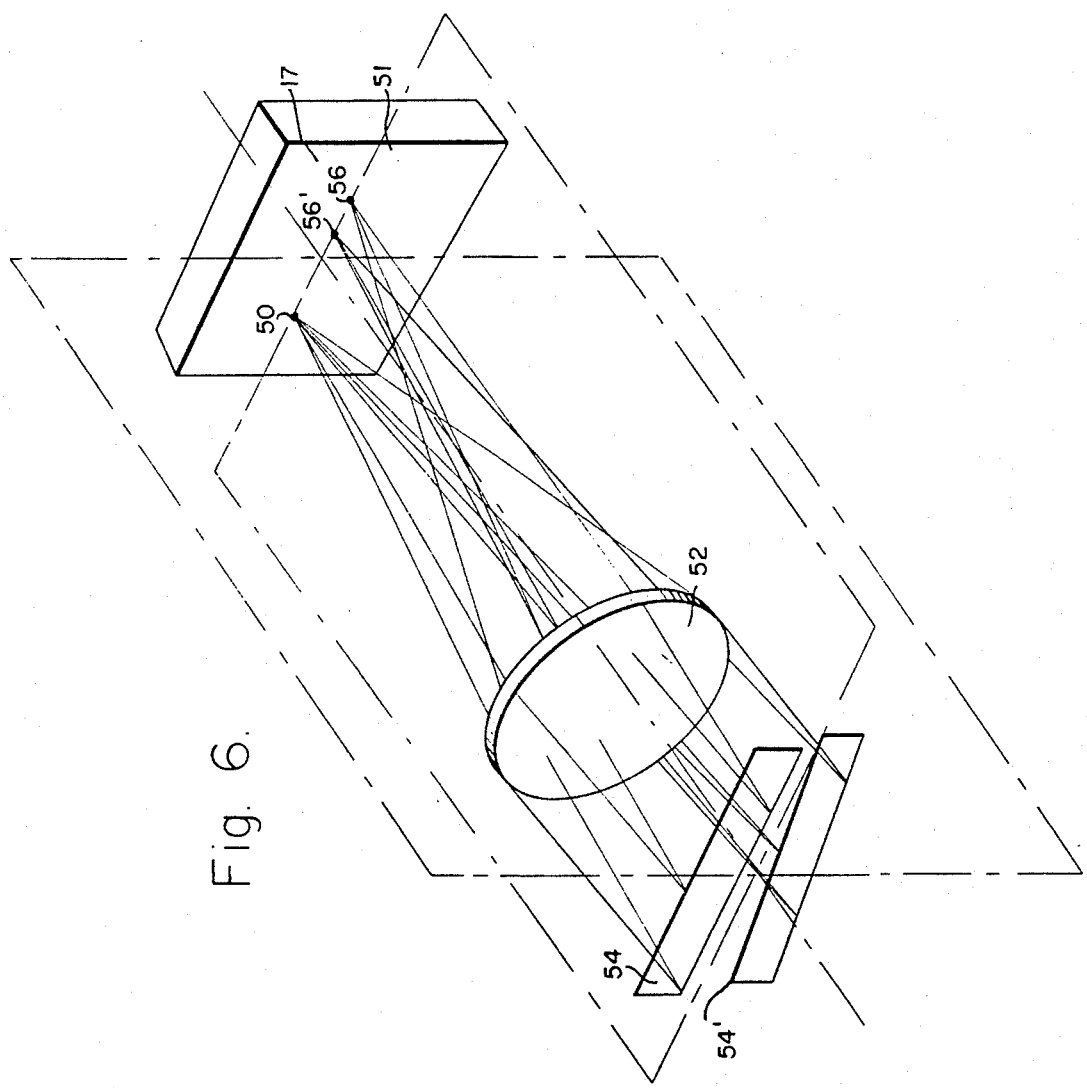
FIG. 6 is a sketch of an alternative embodiment, which may be used as a visual focus tester.

In FIG. 1, a block diagram sets forth the function and interrelations of the various elements of the present invention when used in conjunction with a camera. A camera lens 1 projects an image 2 at or near a predetermined plane which coincides with the emulsion plane of the film within the camera. This image is in turn an object from which distinguishable double images are formed by image forming and doubling means 3. The vertical positions of the double images with respect to each other are detected, and this information is transformed into a useful signal, at vertical position detecting and signal producing means 4, 4'. If the resultant signal is electrical in nature, for example an electric current having a polarity and magnitude related to the vertical direction and distance by which the double images are separated, it may be used to actuate a servo 5. Since the vertical direction and distance by which the double images are separated are related to the direction and distance by which the image 2 is displaced from the predetermined plane, the servo 5 may be employed to command a motor 6 to reposition the camera lens 1 so that its image 2 is maintained at optimum focus.

FIG. 2 shows the optical portion of a preferred embodiment of the invention. A "Scheiner" lens 10 is shown, which is generally meant to describe a lens in which the central horizontal area is occluded, for example by a shield 12. A thin prism 14 is located behind the lower portion of the Scheiner lens 10. Between the prism 14 and the Scheiner image plane 16, there is located a plane parallel slab 18 which may be rotated about an axis that is parallel to the long axis of the occluded area of the Scheiner lens 10.

Rotation of the slab 18 about its axis is provided by a small constant-speed motor 20. Two light sensors 22, 22' for example photo electric cells, are located in the Scheiner image plane 16 at reference points 30, 30', respectively.

In operation, the system shown in FIG. 2 is positioned such that the image of the camera system, which is formed at or near the predetermined plane which coincides with the emulsion plane of the film within the camera, is the Scheiner object 24 of the Scheiner lens 10. This results in the formation of two sets of light rays 26, 28, which if left undisturbed would form two optically coincident images at the Scheiner image plane 16, when the image formed by the camera lens 10 is located at the predetermined plane.

The lower light rays 26, however, are laterally deflected by the prism 14, causing a horizontal separation of the two Scheiner images at their image plane 16. When the camera image (i.e., the Scheiner object 24) is in optimum focus, therefore, the two Scheiner images will be horizontally aligned, defining reference points 30, 30' at the Scheiner image plane 16 which indicate perfect focus of the camera image 24.

This condition of optimum focus is shown in FIG. 3(a), where the camera image (i.e., the Scheiner object 24) is formed at the predetermined plane 17 (the emulsion plane 17 of the film), producing Scheiner images 31, 31' at the respective reference points 30, 30'. If the Scheiner object 24 precedes the predetermined plane 17, as shown in FIG. 3(b), the Scheiner images 31, 31' at the Scheiner image plane 16 are vertically separated. Similarly, if the Scheiner object 24 proceeds the predetermined plane 17, as shown in FIG. 3(c), the Scheiner images 31, 31' at the Scheiner image plane 16 are vertically separated in a direction opposite to that shown in FIG. 3(b). The amount of the vertical separation of the Scheiner images 31, 31' at the Scheiner image plane 16, and the direction of their relative positions, are therefore related to the distance and direction, respectively, by which the Scheiner object 24 has departed from the predetermined plane 17, i.e., by which the image at the predetermined plane 17 is out of focus.

Returning to FIG. 2, when the rotating plane parallel slab 18 is interposed between the prism 14 and the Scheiner image plane 16, the light rays 26, 28 impinging upon the rotating slab 18 are refracted such that the Scheiner images vertically sweep the image plane 16. The light sensors 22 are each excited once during each half revolution of the slab 18. The pulsating light signals received by the light sensors 22 are then converted into two sets of electrical impulses, having a frequency based upon the slab rotation speed and which bear a phase relationship to each other based upon vertical image separation. These electrical impulses are processed to produce an electrical error signal whose polarity and magnitude are ultimately proportional to the focus of the image produced by the camera system.

In FIG. 4 there is shown this preferred embodiment of the present invention, packaged in a housing 32. A sighting aperture 34 is provided at the front end of the housing 32, and electrical connectors 36 are provided at the rear end of the housing 32. The combination of lenses indicated at 38 and the central occluding shield 40 comprise a Scheiner lens system, and may be considered as equivalent to the single Scheiner lens 10 of FIG. 2.

FIG. 5 is representational of the placement of focus sensing devices such as that shown in FIG. 4. When the camera is equipped with a rectangular platen, the film format 42 is also rectangular (conforming to the platen), and the circular image 44 formed at the emulsion plane of the film by the circular camera lens is at least as large as the diagonal of the film format 42. Therefore, there are portions 46 of the image 44 which fall off the film format 42. It is this portion of the image, for example at 48, which is examined.

FIG. 6 shows an alternative embodiment of the invention, which may be used to visually test focus of a camera when the camera is not taking pictures. There is shown an illuminated slit 50, which may be located in the same plane as a translucent screen 51 which coincides with the emulsion plane 17 of the film. The light from this slit 50 is refracted by the camera lens 52, and impinges upon two mirrors 54, 54' which are located in a cap placed in front of the camera lens 52. The mirrors are slightly skewed horizontally with respect to each other, and further positioned such that the light is reflected back through the lens 52, producing Scheiner images 56, 56' on the translucent screen 51. The vertical separation of the Scheiner images 56, 56' may be visually detected by viewing the reverse side of the translucent screen 51.

Thus, there has been shown two embodiments of an invention for detecting changes in focus at a predetermined image plane of an optical system, and more specifically, for the automatic maintaining and visual testing of the focus of a camera image. The invention lends itself to embodiments having concentric tubular construction, thus providing mechanical rigidity, ease of alignment, light weight, relative freedom from the effects of vibration, and the ability to fit existing cameras without major redesign.

Other embodiments of the present invention and modifications of the embodiments herein presented may be developed without departing from the essential characteristics thereof.

Accordingly, the invention should be limited only by the scope of the claims listed below.

What is claimed as new is:

1. Apparatus to detect and signal the deviation from optimum focus of an optical system image with respect to a predetermined plane, said apparatus comprising:
   (A) image forming and doubling means having a reference plane, said means adapted to be positioned to receive as an object the optical system image, for forming at said reference plane double images of the object, the separation of said double images in a first direction being related to the displacement of the optical system image from the optical system predetermined plane, said double images being laterally separated by a predetermined distance in a second direction, orthogonal to said first direction; and
   (B) detecting and signalling means positioned to receive said double images at said reference plane, for detecting the separation of said images with respect to each other in said first direction, and for producing a signal corresponding to the separation so detected;

whereby, said signal corresponding to the first direction separation of said double images is related to the displacement of the optical system image from the optical system predetermined plane.

2. The apparatus of claim 1, above, wherein said detecting and signalling means include:
   (A) transducing means responsive to said double images for converting the light energy therefrom to corresponding electrical signals, and
   (B) error signal generating means connected to said transducing means and responsive to said electrical signals, for producing a resultant electrical error signal having a magnitude proportional to said first direction separation;

whereby, the magnitude of said resultant electrical error signal represents the distance by which the optical system image is displaced from the optical system predetermined plane.

3. The apparatus of claim 2, above, wherein said error signal generating means includes means responsive to the relative separation of said image in said first direction for producing a first polarity error signal if a one of said double images is displaced in said first direction and a second polarity error signal if the other of said double images is displaced in said first direction;

whereby, the polarity of said resultant error signal represents the direction by which the optical system image is displaced from the optical system predetermined plane.

4. The apparatus of claim 3, above, further including servo means adapted to be connected to the optical system and to said error signal generating means and operable in response to said error signals for changing the focus of the optical system to maintain optimum focus of the image at the predetermined plane.

5. The apparatus of claim 3, above, wherein the optical system is included in a camera.

6. The apparatus of claim 3, above, wherein the optical system is included in a camera, and the apparatus further includes servo means adapted to be connected to the objective lens of the camera and to said resultant electrical error signal, to control positioning of the camera lens in response to error signals so that the image at the predetermined image plane of the camera is maintained at optimum focus.

7. The apparatus of claim 3, above, wherein said image forming and doubling means include a Scheiner lens system to form double images separable in said first direction as a function of the focus of the optical system image.

8. The apparatus of claim 3, above, wherein said image forming and doubling means include a prism situated in the path taken by one of said images, for laterally deflecting one of said images in said second direction.

9. The apparatus of claim 3, above, wherein said transducing means include:
   (A) means for relating separation of said double images in said first direction to a time coordinate, including
      (i) means for periodically scanning each image in said first direction upon said reference plane,
      (ii) reference points aligned in said second direction on said reference plane, located so that each of said scanned images will periodically impinge upon one only of said reference points; and
   (B) means for converting said light energy at said reference points into said electrical signals.

10. The apparatus of claim 3, above, wherein said transducing means include:
   (A) means for relating separation of said double images in said first direction to a time coordinate, including
      (i) a plane parallel slab having an axis in said second direction, said slab situated in the path taken by said separated double images and which is adapted to rotate about said axis, to simultaneously project each image on said reference plane, said projected image sweeping said plane in said first direction;
      (ii) reference points aligned in said second direction on said reference plane, and located so that each of said projected images periodically impinges upon a corresponding one of said reference points; and
   (B) photoelectric devices located at said reference points.

11. Apparatus to detect and signal the deviation from optimum focus of an optical system image with respect to a predetermined plane, said apparatus comprising:

(A) a Scheiner lens system, and a Scheiner image plane, said Scheiner lens system adapted to be positioned to receive as a Scheiner object the optical system image, for forming at said Scheiner image plane Scheiner images of said Scheiner object, the separation of said Scheiner images in a first direction being related to the displacement of the optical system image from the optical system predetermined plane;
   (B) a prism situated in the path taken by one of said Scheiner images, for laterally deflecting one of said Scheiner images in a second direction orthogonal to said first direction; and
   (C) detecting and signalling means positioned to receive said Scheiner images at said Scheiner plane, for detecting the separation of said Scheiner images with respect to each other in said first direction, and for producing a signal corresponding to the separation so detected, including
      (i) transducing means responsive to said Scheiner images for converting the light energy therefrom to corresponding electrical signals, including
         (a) means for relating separation of said Scheiner images in said first direction to a time coordinate, including
            (1) a plane parallel slab having an axis in said second direction, said slab situated between said prism and said Scheiner image plane and in the path taken by said Scheiner images, and which is adapted to rotate about said axis to simultaneously project each Scheiner image on said Scheiner image plane, said projected images sweeping said plane in said first direction,
            (2) reference points aligned in said second direction on said Scheiner image plane, and located so that each of said projected Scheiner images periodically impinges upon a corresponding one of said reference points,
         (b) means for converting said light energy at said reference points into said electrical signals, said means including photoelectric devices, and
      (ii) error signal generating means connected to said transducer means and responsive to said electrical signals, for producing a resultant electrical error signal having a magnitude proportional to said first direction separation and a polarity in accordance with the relative displacement in said first direction of a one of said Scheiner images with respect to the other of said Scheiner images;

whereby, said magnitude and polarity of said resultant electrical error signal represents the distance and direction, respectively, by which the optical system image is displaced from the optical system predetermined plane.

12. The apparatus of claim 11, above, further including servo means connected to the optical system and to said resultant electrical error signal generating means and operable in response to said error signals for changing the focus of the optical system to maintain optimum focus of the image at the predetermined plane.

13. The apparatus of claim 11, above, wherein the optical system is included in a camera.

14. The apparatus of claim 11, above, wherein the optical system is included in a camera, and said apparatus further includes servo means adapted to be connected to the objective lens of the camera and to said resultant electrical error signals, to control positioning of the camera lens in response to error signals so that the image at the predetermined image plane of the camera is maintained at optimum focus.

15. In apparatus for detecting the focal status of an optical system image producible at a predetermined plane:

(A) image forming and doubling means having a reference plane, for producing at said reference plane double images from the optical system image, said double images having a separation in a first direction related to defect in focus of the optical system image; and (B) lateral separation means for creating a separation between said double images at said reference plane in a second direction orthogonal to said first direction.

16. The apparatus according to claim 15, above, wherein said lateral separation means is a prism situated in the optical path of one of said double images.

17. The apparatus according to claim 15, above, further including image receiving means positioned at said reference plane for displaying said double images.

18. The apparatus according to claim 15, above, wherein said reference plane is adapted to coincide with the predetermined plane.

19. The apparatus according to claim 15, above, wherein said image forming and doubling means include a Scheiner lens.

References Cited

UNITED STATES PATENTS

| | | | |
|---|---|---|---|
| 3,367,254 | 2/1968 | Townsley | 95—44 |
| 2,134,757 | 11/1938 | Goldsmith | 95—44 XR |
| 2,378,930 | 6/1945 | Kendall et al. | 95—44 XR |
| 2,524,807 | 10/1950 | Kallmann | 95—44 XR |
| 3,274,881 | 9/1966 | Sauer | 95—44 XR |

OTHER REFERENCES

Schleicher, B. Sharp Focus in Enlarging and Copying. In the British Journal of Photography, Sept. 12, 1924.

NORTON ANSHER, Primary Examiner

F. L. BRAUN, Assistant Examiner

U.S. Cl. X.R.

250—234